(12) United States Patent
Metla et al.

(10) Patent No.: US 10,554,488 B2
(45) Date of Patent: Feb. 4, 2020

(54) DEVICE, SYSTEM AND METHOD FOR PROVIDING ADDITIONAL FUNCTIONALITY TO AN APPARATUS

(71) Applicant: Axis AB, Lund (SE)

(72) Inventors: Anil Kumar Metla, Lund (SE); Carl-Axel Alm, Lund (SE); Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 134 days.

(21) Appl. No.: 15/987,562

(22) Filed: May 23, 2018

(65) Prior Publication Data
US 2018/0343163 A1 Nov. 29, 2018

(30) Foreign Application Priority Data
May 24, 2017 (EP) ..................... 17172722

(51) Int. Cl.
| | |
|---|---|
| *H04L 12/28* | (2006.01) |
| *H04L 12/24* | (2006.01) |
| *H04N 5/232* | (2006.01) |
| *H04L 29/08* | (2006.01) |
| *H04N 7/18* | (2006.01) |
| *G08B 25/14* | (2006.01) |
| *G08B 13/196* | (2006.01) |
| *H04L 29/06* | (2006.01) |

(52) U.S. Cl.
CPC ...... *H04L 41/0806* (2013.01); *H04L 12/2838* (2013.01); *H04L 67/025* (2013.01); *H04L 67/125* (2013.01); *H04L 67/34* (2013.01); *H04N 5/23206* (2013.01); *H04N 7/181* (2013.01); *H04N 7/183* (2013.01); *H04N 7/185* (2013.01); *G08B 13/19656* (2013.01); *G08B 25/14* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,240,533 B1 * | 5/2001 | Slemmer | H04L 41/0663 714/48 |
| 2003/0193571 A1 | 10/2003 | Schultz et al. | |
| 2008/0164316 A1 | 7/2008 | Patel et al. | |
| 2008/0186979 A1 | 8/2008 | Kolar | |
| 2009/0245268 A1 | 10/2009 | Pugliese, IV | |

(Continued)

OTHER PUBLICATIONS

"Ethernet I/O Set Up"; pp presentation; www.dvtsensors.com.
EP 17172722.5 European Search Report (dated Oct. 4, 2017).

*Primary Examiner* — Kodzovi Acolatse
(74) *Attorney, Agent, or Firm* — Volpe and Koenig, P.C.

(57) ABSTRACT

A device and method for providing additional functionality to an apparatus having a network connector by which the apparatus is configured to be connected to a network and to be allocated an identifier in the network, wherein the device is adapted to be connected between the network and the apparatus, wherein the device is configured to communicate with the network using a first network portion, wherein the device is configured to communicate with the apparatus using a second network portion, wherein logic circuitry of the device is accessible in the network via the apparatus using the second network portion. The device may be found in a system.

15 Claims, 2 Drawing Sheets

(56) References Cited

U.S. PATENT DOCUMENTS

| | | |
|---|---|---|
| 2010/0060747 A1 | 3/2010 | Woodman |
| 2011/0235502 A1* | 9/2011 | Yamada ............ H04B 7/15557 |
| | | 370/217 |
| 2011/0292207 A1* | 12/2011 | Bae ..................... H04N 7/181 |
| | | 348/143 |
| 2012/0210416 A1* | 8/2012 | Mihelich ............ H04L 63/0218 |
| | | 726/11 |
| 2013/0305320 A1 | 11/2013 | Warrick et al. |
| 2014/0152837 A1* | 6/2014 | Hiramatsu ............ H04N 7/181 |
| | | 348/159 |
| 2015/0015719 A1* | 1/2015 | Campana ............ H04N 7/181 |
| | | 348/159 |
| 2015/0181088 A1 | 6/2015 | Wu et al. |
| 2015/0195103 A1* | 7/2015 | Shigeeda ............ H04L 12/4641 |
| | | 370/392 |
| 2017/0180274 A1* | 6/2017 | Liu ..................... H04L 12/6418 |
| 2018/0270230 A1* | 9/2018 | Schmidt ............ H04L 12/4625 |
| 2018/0288126 A1* | 10/2018 | Smart ..................... H04L 69/22 |
| 2018/0300802 A1* | 10/2018 | Nishino .................. H04N 7/18 |

\* cited by examiner

DEVICE, SYSTEM AND METHOD FOR PROVIDING ADDITIONAL FUNCTIONALITY TO AN APPARATUS

FIELD OF INVENTION

The present disclosure relates to a device, system, and method for providing additional functionality to an apparatus having a network connector by which the apparatus is configured to be connected to a network and to be allocated an identifier in the network.

BACKGROUND

Devices for providing additional functionality to an apparatus are known in the art. Such devices may be used for example to add specific functionality to an apparatus in a case where said functionality was not previously available for the apparatus. Alternatively, or additionally, such devices may be used to extend, or improve, on a functionality already available for the apparatus. The functionality may be for example, increased number of I/O ports, audio capturing functionality or the like.

One example of a device for adding functionality known in the art is extension modules adapted to be connected to an apparatus using a special port or slot of the apparatus. The connection is either made by direct physical contact between the device and the apparatus, such as for dongles or removable electronic circuit boards, or via an extension cable connecting the extension module to the apparatus. As an example, audio extension modules may be connected to network monitoring cameras using a USB connection.

Another example of a device for adding functionality known in the art is network extension devices. One example of such a device is the Axis P8221 Network I/O Audio Module. Such devices are adapted to be connected to a network wherein the functionality of the network extension device may be added to the functionality available within the network and associated with an apparatus available within the network.

A problem with the devices for adding functionality known in the art is that they either require specific hardware components (such as a special interface, e.g., a USB port and/or special circuits) in the apparatus for being connectable to the device or they require a unique identifier (such as an IP address) within the network. There is thus a need in the art for an improved manner for adding functionality to an apparatus which addresses these problems.

SUMMARY

It is an object to provide a manner of adding functionality addressing the above mentioned problems.

According to a first aspect, this has been achieved by a device for providing additional functionality to an apparatus having a network connector by which the apparatus is configured to be connected to a network and to be allocated an identifier in the network, the device comprising a first connector for connecting the device to the network, a second connector for connecting the device to the network connector of the apparatus, whereby the device is adapted to be connected between the network and the apparatus, the device further comprising: one or more components for providing the additional functionality and logic circuitry for controlling the additional functionality, wherein the device is configured to communicate with the network using a first network portion, wherein the device is configured to communicate with the apparatus using a second network portion, wherein the logic circuitry is accessible in the network only via the apparatus using the second network portion.

The apparatus may be any kind of device adapted to be connected to a network. For example, the apparatus may be a network monitoring camera, a PACS controller, a door station or a networked speaker.

The term adding functionality may be related to adding a different kind of functionality not provided by the apparatus and/or to adding another instance or replacement instance of a functionality already performed by the apparatus. This may be advantageous in some situations where the kind of functionality performed by the apparatus may be insufficient to carry out a certain task. In the example with the network monitoring camera, the addition of sound capturing means would allow supplying a user with recordings of both images and sound, i.e. audio-visual data such as a video sequence having a time-synced audio track. Alternatively, or additionally, the use of the device may add functionality of the same kind to the functionality already available in the apparatus. This may be advantageous in some situations where the capacity of the apparatus to perform a certain functionality is insufficient to carry out a certain task. In the example with the network monitoring camera, the addition of further I/O ports would allow a user and/or installation technician to connect further devices to the apparatus, thus making the apparatus more versatile.

The first network portion may be a communication means for establishing communication in a computer network. In the first network portion, a network communication protocol may be used. The network communication protocol may be based upon the use of known data communication protocols such as for example any of the protocols available under Internet protocol suite (TCP/IP). However, the first network portion need not in the disclosure be regarded as exclusively using a known data communication protocol, such as, e.g., TCP, UDP or the like. The first network portion may also include use of other constraining parameters, such as specific addressing and/or communication channels. For example, the network communication protocol may operate using the TCP/IP protocol on a first virtual local area network (VLAN). Moreover, the first network portion may use so far unknown data communication protocols or a combination of data communication protocols.

The second network portion may be a communication means for establishing communication locally within a computer network. Thus, it is to be understood that a local communication protocol in the second network portion may include the data communication protocols listed herein as examples for the network communication protocol in the second network portion. However, the second network portion need not in the disclosure be regarded as exclusively using a known data communication protocol, such as e.g. TCP, UDP or the like. The second network portion may also include use of other constraining parameters, such as specific addressing and/or communication channels. For example, the second network portion may operate using the Ethernet protocol on a link-local address on a second virtual local area network different than the first virtual local area network.

From this follows that the same data communication protocol may be used for the first network portion and the second network portion with a differentiation being provided for example by using different virtual local area networks. Alternatively, different data communication protocols may be used for the first network portion and the second network portion.

The device may be advantageous as it allows for adding functionality to the apparatus in a convenient way. By connecting the device between the network and the apparatus, no additional connectors, slots or ports are needed on the apparatus. Thus, the apparatus may be configured to operate together with the device merely by upgrading a firmware of the apparatus. As an example, if the apparatus is a monitoring camera adapted to capture digital images and/or video sequences, the use of a device comprising audio capturing means may be used to increase the functionality of the monitoring camera such as to allow recording of sound. To a user of the camera, it will appear as though the monitoring camera has audio capturing means while in reality, the monitoring camera in itself is only capable of imaging.

The components for adding the additional functionality may be placed in the device itself. Alternatively, one or more from the components may be connectors allowing connection of other components, such as, e.g., an audio port allowing connection of a microphone.

As disclosed hereinabove, when connected to the apparatus using the second connection, the device is configured to communicate with the apparatus using the second network portion and the logic circuitry of the device is accessible in the network only via the apparatus using the second network portion. One way to achieve this effect is to use different protocols for the first and second network portions. In such a case, the device may be configured to be invisible for attempts to communicate using the network communication protocol of the first network portion. Alternatively, the effect may be achieved by other means. For example, the device may be configured to communicate with the network and the apparatus using the same type of protocol, such as the TCP/IP protocol, but within different virtual networks. In such a case, the communication between the apparatus and logic circuitry of the device may occur within one virtual network whereas the communication between the apparatus and the network may occur in another virtual network.

It may be noted that the device may be connected directly to the apparatus having an identifier using a cable or a wireless connection. However, it is also conceivable to connect the device to the apparatus of interest via another apparatus or device. For instance, the device may be connected to the apparatus of interest having an identifier allocated to it via a second device of the kind disclosed above.

Specifically, the logic circuitry may be accessible in the network only via the apparatus using the identifier allocated to the apparatus. This may be advantageous as there is one less point of attack, thus making the system safer. The apparatus will receive an identifier, such as an IP address, from the network, thereby becoming visible and accessible in the network. For a user, the device and its functionality is thus accessible only "through" the camera on the same IP address as that of the camera. In other words, the functionality of the device is accessed and controlled via the apparatus. Hence, in the network it will appear as if the apparatus has the functionality of the device. This may make the system less expensive to maintain, as adding a device to an apparatus already part of a system does not require acquiring an additional IP address. A further advantage may be that a system comprising one or more apparatuses of the kind disclosed herein, will be conveniently adjustable in terms of its functionality. For example, the functionality of an apparatus located in one room may be extended by the addition of a device, whereas the functionality of another apparatus located in another room may be decreased by the removal of a device. Such adjustments of functionality may be undertaken without having to perform any changes to the network. Specifically, no additional identifiers, such as IP addresses, are needed.

A further benefit of communicating directly with the apparatus through the device according to the present teachings is that it may allow for using an arbitrary security protocol as part of the network communication protocol. As long as the apparatus is configured to correctly interpret a chosen security protocol, any security protocol may be chosen regardless of the capability of the device to interpret the same, as the device does not need to be involved in the communication between the network and the apparatus apart from forwarding data packets without the need to understand the content. Such security protocols include for example HTTPS, SSH, SFTP, TLS, SSL, SRTP, SRTCP, and VPN. If the communication between the apparatus and the device using the local communication protocol needs to be secure, any of the listed security protocols may be used. In such a case, the logic circuitry may be configured to interpret the security protocol used as a part of the local communication protocol.

In some applications, the device may be located close to the apparatus. This may be an advantage for example when recording audio with the device and video with the apparatus for combining the audio and video into audio-visual data. In other applications, the device may be located at a distance from the apparatus. This may be an advantage for example when easily accessible I/O ports are needed for an apparatus located at a position which is not easily accessible, such as for example inside a secure area.

The device may be connected to the apparatus and/or the network by a physical cable. Specifically, the device may be connected to the apparatus and/or the network by a telecommunications cable, such as an Ethernet cable. Alternatively, the device may be connected to the apparatus and/or the network by a wireless connection.

The second connector may be the only connector among the first and second connectors being associated with an identifier for allowing the connector to be identifiable using the network communication protocol. This may be advantageous as it further decreases the risk of unwanted access, thus making the system safer.

The second connector may be associated with an identifier identifiable using the second network portion. This implies that the apparatus may establish communication with the device by scanning an identifier using the second network portion. Once the identifier has been located, the device may be accessed from the apparatus using the second network portion, thereby making the functionality of the device accessible for a user via the network communication to the apparatus. Such an identifier may be for example a MAC address of the device.

The device may be configured to transmit communication between the network and the apparatus using the same network communication protocol as in the first network portion. This may be advantageous as it simplifies the communication in the network. Thus, the same communication protocol is used all the way to the apparatus independent on whether the communication is transmitted via the device or directly to the apparatus in case the device is not used. Specifically, according to some embodiments, the device is configured to transmit communication between the network and the apparatus using the identifier allocated to the apparatus and using the first network portion.

The device may comprise or one or more connectors for connecting one or more components for providing the additional functionality. The one or more components may be for example microphones, I/O ports, motion sensors, smoke detectors, etc.

At least one of the first and second connectors may be an Ethernet connector. Preferably, both the first and second connectors are Ethernet connectors. The Ethernet connector(s) may be of the type RJ45.

The network communication protocol may be based on the TCP/IP protocol stack. The TCP/IP protocol stack is an example of an OSI network model implementation.

The network communication protocol used in the first network portion may comprise one or more data communication protocols selected from the group consisting of: TCP/IP, UDP, SSH, HTTP, HTTPS, FTP, SMTP, SMB, RTSP, RTP, SFTP, NTP, ARP, PING, VPN, SRTP, SRTCP.

The local communication protocol used in the second network portion may be based upon a combination of data protocols, such as Ethernet, point-to-point protocol (PPP), TCP/IP, VLAN, etc. Each of these protocols play a part in the OSI or TCP/IP communication stack. For example, TCP is part of the transport layer protocol, and an equivalent protocol in the same layer is UDP. IP is part of the network layer, and has IPv4 and IPv6. VLAN is a Virtual Local Area Network that can be achieved in two different ways: port based VLAN, which is static, or 802.1q, which is dynamic.

In other words, the local communication protocol may comprise one or more data communication protocols implemented using link-local addressing, the one or more data communication protocols being selected from the group consisting of: TCP/IP, PPP, Ethernet, VLAN.

Link-local addressing helps to achieve a non-routable address within a network. Link-local addresses can be implemented in both IPv4 and IPv6, which are two different addressing mechanisms in IP addressing.

The device may be configured to communicate interface information to the apparatus upon connecting the device to the apparatus, said interface information being adapted to automatically add a configuration of features related to the additional functionality of the device to a user interface of the apparatus. This may be advantageous as it allows for a plug and play solution where the user interface of the apparatus will be automatically adjusted for convenient configuration of the functionality of the apparatus and device.

The device may be configured to receive a data stream containing external instructions for controlling features of the additional functionality, to transmit the data stream containing the external instructions to the apparatus, and to receive the external instructions from the apparatus. The device may be configured to receive a data stream containing the external instructions via the first connector using the network communication protocol. The device may be configured to transmit the data stream containing the external instructions received from the network via the logic circuitry to the apparatus. Alternatively, the device may be configured to transmit a data stream containing the external instructions received from the network directly to the apparatus without use of the logic circuitry. Thus, although the external instructions may be said to be received and transmitted by the device using the network communication protocol, it is to be understood that the external instructions are not executed on the device during the process. The receiving and transmitting of external instructions instead means forwarding the external instructions (e.g., in the form of data packages or data streams containing the instructions). However, once the external instructions have reached the apparatus, the apparatus may transmit the external instructions to the device using the local communication protocol. The device may then be arranged to receive the external instructions from the apparatus using the local communication protocol, whereby the external instructions are forwarded to the logic circuitry, thus allowing the instructions to be executed.

The logic circuitry may be configured to stream, to the apparatus, audio data captured by audio capturing means of the device. The audio data may be synced with video data captured by video capturing means of the apparatus.

The device may further comprise a network switch connected between the second connector and the logic circuitry. This may be advantageous as it adds the versatility of a network switch to the device without compromising the aspects of safety, as the device is not accessible from the network using the first connector. Hence, the addition of a network switch of the device should not be construed as turning the device into a conventional switch. The network switch may have its configuration defined by the logic circuitry automatically. Said configuration may be adapted by the logic circuitry to support various network scenarios involving the device and the apparatus. The logic circuitry may, e.g., be accessed by connecting the device to a network using the second connector and be configured according to the network scenario it is to be used in. Thereafter the device is connected to the network according to the specified network scenario and the logic circuitry will automatically configure the network switch accordingly. Specifically, the logic circuitry of the device may be configured to be accessible only from the apparatus via the second connection.

A feature of the device is that the first connector and the second connector have different functions. Thus, it is not possible to use a reversed coupling scheme, i.e. to connect the apparatus to the first connector and the network to the second connector and achieve the same results as when connecting the apparatus to the second connector and the network to the first connector. This feature of the device may be achieved by hard-coding the connector functionalities. However, said feature of the device may alternatively be achieved by means of a software configuration of the device. This may be advantageous as it may allow for temporarily redefining the functionality of the connectors, for example when the device is not in use. Specifically, using software reconfiguration, the functionality of the connectors may be reversed, one or more connectors may be blocked etc. Such a reconfiguration of the device may be achieved by means of a firmware upgrade. The device may then be reset to the required configuration by means of a system reboot. One example where a reconfiguration of the device may be useful is when performing system maintenance of the device, such as for example when upgrading the firmware of the device.

This implies that the device may be accessible from the network using the network communication protocol when connecting the device to the network using the second connector. The device may be adapted to receive an identifier, such as an IP address, from the network for establishing communication. The device may have to be rebooted and the second connector re-switched from link-local addressing to IP addressing before the device is able to receive an identifier from the network. Specifically, according to some embodiments, the logic circuitry of the device is accessible in the network when the device is connected to the network via the second connector. In a case where the device is connected to the network and/or the apparatus using physical cables, it is understood that a physical reconfiguration of the connections will be needed in order to access the logic circuitry from the network. Thus, the risk of unwanted access from the network will not increase. In a case where the device is connected to the network and/or the apparatus using wireless connections, the accessibility options of the connectors may be switched or adjusted either by means of a command sent to the device from the apparatus using the local communication protocol, or by using a manual button and/or switch on the device.

According to some embodiments, the device may be adapted to receive power over an Ethernet connection. Such an Ethernet connection may be for example the connection between the device and the network through the first connector or the connection between the device and the apparatus through the second connector. Alternatively, the power may be supplied via a separate Ethernet connection through a further connector of the device. One or more from the first and second connector may comprise a powered device (PD) port. According to some embodiments, the network switch of the device is a power over Ethernet (PoE)-enabled networking device.

The device may comprise more than one second connector. Specifically, according to some embodiments, the device comprises two or more second connectors each of the two or more second connectors being configured to communicate with one from two or more apparatus using a local communication protocol. This may be advantageous as it allows for connecting more than one apparatus to a device, thus simplifying the system. The functionality of the device may be accessible from each of the two or more apparatus. Alternatively, the each of the apparatuses of the two or more apparatuses may access a specific part of the functionality of the device.

According to a second aspect, there is provided a system comprising a device according to the first aspect and a monitoring camera, wherein the first connector of the device is connected to a network and the second connector is connected to the monitoring camera.

The system may further comprise one or more components for providing the additional functionality.

The additional functionality may be selected from the group consisting of: audio capturing means for capturing audio signals; analogue I/O connectivity, for transmitting and/or receiving analogue signals; digital I/O connectivity for transmitting and/or receiving analogue signals; serial connectivity for communicating using serial data protocols; storage connectivity for connecting to external storage means; storage means; power connectivity for receiving and/or supplying power; illumination devices or heaters; access control connectivity for connecting to external access control means; and access control means.

The audio capturing means may comprise a digital microphone adapted to detect sound waves and output a digital audio signal. The audio capturing means may be a digital audio capturing device forming a part of the device. The digital microphone may be a MEMS microphone. The digital microphone may be a PDM microphone. The digital microphone may be a I2C microphone.

The analogue I/O connectivity may comprise for example analogue voltage input/output connectors, analogue current input/output connectors, analogue audio out connectors, analogue microphone in connectors, etc.

The digital I/O connectivity may comprise for example relay connectors for relaying digital data to a further device, digital audio input/output connectors and digital connectors for connecting to sensors (such as, for example, motion sensors, PIR), detectors, alarm systems, etc.

The serial connectivity may comprise for example USB connectors, RS-232 connectors, RS-434 connectors, etc.

The storage connectivity may comprise for example SD connectors, USB connectors, SATA connectors, etc. The storage connectivity may allow for connecting the device to a storage unit, such as for example a SD disc, hard drive or solid state memory.

The storage means may comprise a storage unit comprising for example an SD disc, a hard drive, a solid state memory.

The power connectivity may comprise for example AC/DC outputs. Such AC/DC outputs may be used for providing power to a further device connected to the device, said further device being for example a sensor or a motor.

The illumination devices may be illuminators working in the visible part of the wavelength spectrum and/or in the IR part of the wavelength spectrum.

Access control connectivity may comprise card reader inputs, keyboard connectivity for connecting to keyboards, keypad connectivity for connecting to keypads, display connectivity to connect to displays, etc.

Access control means may comprise for example keyboards, keypads, switches, buttons, RFID units, NFC units, displays, finger print readers, etc.

According to a third aspect, there is provided a method for providing additional functionality to an apparatus, the apparatus having a network connector by which network connector the apparatus is configured to be connected to a network and to be allocated an identifier in the network, the method includes: connecting a device between the network and the apparatus by connecting a first connector of the device to the network connector of the apparatus and connecting a second connector of the device to the network; initiating a logic circuitry of the device for controlling the additional functionality; configuring a network switch of the device to communicate with the apparatus using a second network portion; initiating a communication between the device and the apparatus using the second network portion; launching software for providing control over a functionality of the device; transferring requests to the device for accessing the additional functionality; and accessing the additional functionality in the network only via the apparatus using the second network portion.

It may be noted that launching software add-ons for providing control over a functionality of the device may include performing an upgrade of the software controlling the apparatus in case such software is not present at all or in a required version on the apparatus from the beginning. The software may be anything from a software executed on a general purpose processing unit to a firmware specific for the hardware for the apparatus.

The step of initiating a communication between the device and the apparatus may comprise the steps of: connecting the device to the apparatus using a static link-local address, upon having connected the device to the apparatus, generating a unique link-local address for communicating with the apparatus, and connecting the apparatus to the device using the unique link-local address. Alternatively, the device may be connected via an IPv4 address. The communication between the device and apparatus may use link-local on and an IPv4/IPv6 address, respectively.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

The method may further comprise accessing the logic circuitry in the network only via the apparatus using the identifier allocated to the apparatus.

A further scope of applicability of the present teachings will become apparent from the detailed description given below. However, it should be understood that the detailed description and specific examples, while indicating embodiments, are given by way of illustration only, since various changes and modifications within the scope of the present teachings will become apparent to those skilled in the art from this detailed description.

Hence, it is to be understood that the present teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

The above discussed different communication modes may also be summarized in accordance with the following:

Communication between the Network and Apparatus

The network and apparatus may communicate via regular TCP/IP protocol stack (which is commonly used for communication with network cameras).

Any network model that implements layered network model can be used instead of TCP/IP.

The addressing of the apparatus can be IPv4 or IPv6, and can be static or dynamic via DHCP.

Communication between Apparatus and Device

The apparatus and device may communicate via regular TCP/IP protocol stack (which is commonly used for communication with network cameras).

Addressing of the Device is achieved through link-local addressing, which can be IPv4 or IPv6. Also, the address can be both static or dynamic via ARP (Address Resolution Protocol)

The address announcement is handled by (Address Resolution Protocol) ARP packets, alternatives can be static IP with lists.

The control information between Apparatus and Device may be handled via TCP or UDP. Any network protocol that achieves the same functionality can be considered as an alternative, for example Stream Transmission Datagram Protocol (SCDP).

The streaming session may established through Real Time Streaming Protocol. Any media streaming protocol can be considered as an alternative.

The streaming data may be handled by Real-Time Transport Protocol (RTP). Alternative may be Realtime Data Protocol (Proprietary).

Streaming Control may be handled by the RTP Control Protocol (RTCP).

VLAN

There may be two VLANs in the setup (e.g., a first VLAN connecting the apparatus to the device and a second VLAN connecting the network to apparatus).

The VLANs may implemented via port based VLAN mechanism. An alternative implementation is a 802.1Q VLAN implementation.

The priority in the VLAN can be achieved by a 802.1P priority protocol if we use 802.1Q VLAN.

BRIEF DESCRIPTION OF THE DRAWINGS

A more detailed understanding may be had from the following description, given by way of example in conjunction with the accompanying drawings where.

DETAILED DESCRIPTION

The present teachings will now be described more fully hereinafter with reference to the accompanying drawings, in which embodiments are shown. The systems and devices disclosed herein will be described during operation.

Figure 1:
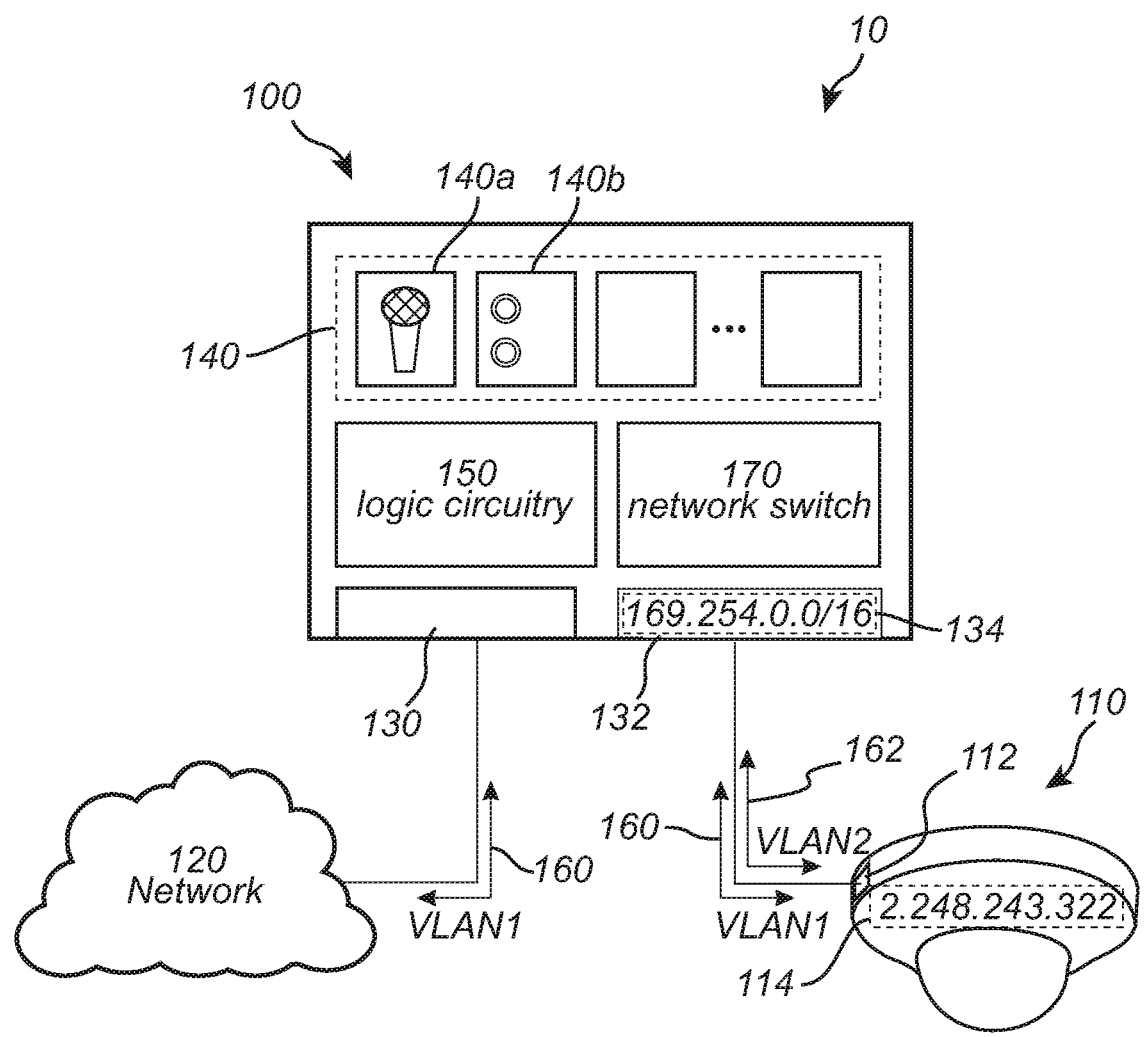
FIG. 1 shows a schematic view of a system comprising a device for adding functionality to an apparatus according to embodiments.

FIG. 1 shows a system 10 comprising a device 100 and an apparatus 110. In the example embodiment, the apparatus 110 is a monitoring camera. However, the apparatus 110 may be any other kind of apparatus capable of communicating with a network 120. The device 100 and apparatus 110 of the system 10 are connected to a network 120 according to an operational connection scheme. The operational connection scheme is intended for allowing the device 100 and apparatus 110 to operate together in the network 120 according to the inventive concept of the disclosure. The device 100 and apparatus 110 of the system 10 may alternatively be connected in other ways. Such alternative connection schemes may, however, not operate as intended. However, further advantages and/or functionalities may be achieved by any such alternative connection scheme. Specifically, a maintenance connection scheme will be discussed later.

The device 100 is intended for providing additional functionality to the apparatus 110. The apparatus 110 has a network connector 112 by which the apparatus 110 is configured to be connected to a network 120 and to be allocated an identifier 114 in the network 120. The device 100 comprises a first connector 130 for connecting the device 100 to the network 120 and a second connector 132 for connecting the device 100 to the network connector 112 of the apparatus 110. According to the operational connection scheme, the device 100 is adapted to be connected between the network 120 and the apparatus 100. In other words, the second connector 132 of the device 100 is connected to the monitoring camera 110 and the first connector 130 of the device 100 is connected to the network 120.

The device 100 is configured to communicate with the network 120 using a first network portion 160. In the example, the first network portion 160 is a network segment or a network link working on a network communication protocol, such as TCP/IP protocol. The first network portion 160 uses the TCP/IP protocol stack operating within a first virtual local area network, VLAN1. VLAN1 handles the traffic between the network 120, the device 100 and the apparatus 110. Thus, the identifier 114 of the apparatus 110 is an IP number. Alternatively, other protocols may be used. Thus, the TCP/IP protocol stack may be replaced by an OSI model stack or any other similar network model stacks.

VLAN may be either port-based VLAN or the 802.1q. Port-based VLAN operates in the Layer 2 (Data Link Layer)

of the TCP/IP network model, while 802.1q VLAN operates in the Layer 3 (Network Layer) of the TCP/IP model.

The device 100 is configured to communicate with the apparatus 110 using a second network portion 162. In the example, the second network portion 162 is a network segment or network link that operates over a local communications protocol, such as TCP/IP. The local communications protocol of the second network portion 162 is the TCP/IP protocol operating within a second virtual local area network, VLAN2. VLAN2 communicates on a link-local address of the device 100 and manages traffic between the apparatus 110 and the device 100. This network configuration makes the device 100 invisible to the network 120 while eliminating the requirement for the device to have an IP address visible in the network. The use of link-local addressing allows for the communication on the second network portion 162 to exist only between the apparatus 110 and the device 100, thus not extending beyond the device 100 to be further transmitted on the network 120.

As disclosed hereinabove, in the example, each network portion is a VLAN, thereby giving two VLANs, VLAN1 and VLAN2, with no possibility of communication in-between them.

When connected as disclosed in FIG. 1 (i.e. according to the operational connection scheme), the logic circuitry 150 is accessible in the network 120 only via the apparatus 110 using the second network portion 162. Thus, it is not possible to directly communicate with the device 100 using the first network portion 160. Furthermore, it is not possible to access the logic circuitry 150 using the first network portion 160. The logic circuitry 150 is accessible in the network 120 only via the apparatus 110 using the identifier 114 allocated to the apparatus.

This operational connection scheme thus allows for a specific access control of the device 100 from the network 120 and from the apparatus 110, respectively. This is achieved by the first 130 and second 132 connectors having different functionality. Specifically, the second connector 132 is the only connector among the first 130 and second 132 connectors being associated with an identifier for allowing the connector to be identifiable using the network communication protocol. In this context it should once again be noted the protocol may be the same and that it is the network portions that differ. Thus, any attempt to directly communicate with the device 100 via the first connector 130 will fail. The second connector 132 is, however, associated with an identifier identifiable using the local communication protocol 162. Such an identifier may be for example a MAC address of the device. Thus, the apparatus 110, which is connected to the second connector 132 of the device 100, may initiate communication with the device 100.

It is thus understood that the device 100 is not accessible from the network via the first connector 130. Still, however, the network traffic on the first network portion 160 may obviously be transmitted to and from the apparatus via the device 100. In other words, the device 100 is configured to transmit communication between the network 120 and the apparatus 110 using the same network communication protocol as in the first network portion 160. The transmitted communication may comprise any type of data, including commands intended for controlling the device 100. In a case where such commands are included in the transmitted communication, the commands are received by the apparatus 110, whereby the apparatus 110 initiates a communication with the device 100 using the local communication protocol 162, transmitting the commands to the device 100. The device 100 is configured to transmit communication between the network 120 and the apparatus 110 using the identifier 114 allocated to the apparatus 110. Thus, from the network 120 it will appear that the apparatus 110 comprises the functionality of the device 100, while in reality the apparatus 110 merely controls the device 100 in order to get access to said functionality.

The device 100 may receive power over Ethernet and is thus a powered device (PD). For this purpose, the device 100 further comprises a power sourcing equipment (PSE) configured to provide power to a network switch 170 of the device 100, which for communication purpose is connected between the second connector 130 and the logic circuitry 150. The network switch 170 of the device 100 is a power of Ethernet (PoE)-enabled networking device, sometimes referred to as a PoE switch. The second connector 132 comprises a powered device (PD) port. The network switch 170 is a data switch that in addition to switching data also provides power over the same cable as the data, although not necessarily on the same wire pairs in the cable. The device 100 is powered via a PD port of the first connector by connecting the PD port to a power source by means of an Ethernet cable. In the example embodiment of the device 100, power is received from a power source in the network 120 via the first connector 130. The device 100 is further configured to provide energy to the apparatus via the second connector 132, which also is a PD port. The network switch 170 of the device 100 negotiates the power requirement of the apparatus 120 and the device 100 with a PoE-enabled device of the network (such as for example a PoE-enabled router or data switch of the network). The device takes the power it needs, and the network switch 170 in turn powers the apparatus 120.

Alternatively, the power source may be a further device connected between the network 120 and the device 100. Alternatively, or as a complement, a power source may be connected between the device 100 and the apparatus 110. These further devices may be for example a so-called "midspan". Midspans are typically power injectors that stand between a regular Ethernet switch and the powered device, injecting power without affecting the data.

The device 100 further comprises one or more components 140 for providing the additional functionality. Specifically, the device 100 comprises a digital audio capturing device 140a for capturing audio data. The digital audio device 140a comprises a digital microphone adapted to detect sound waves and output a digital audio signal. The digital microphone may be a MEMS microphone. The digital microphone may be a PDM microphone. The digital microphone may be a I2C microphone. The sound captured by the digital audio capturing device 140a is transmitted to the apparatus 110 using the local communication protocol 162. The digital audio data is merged with video data captured by the apparatus 110 resulting in audio-visual data. The audio-visual data is communicated from the apparatus 110 to the network 120 using the network communication protocol of the first network portion 160.

The device 100 may further comprise an I/O unit 140b configured to provide connection ports, thus allowing for extending an effective connectivity of the apparatus 110. The I/O ports may be used for example for connecting further devices to the apparatus, such as devices that do not have network connectivity. Such components may be for example temperature sensors, humidity sensors, motion detectors or the like. The I/O unit 140b may also be used for transmitting a signal to a further device, such as an alarm unit or a door lock relay.

Although specifically disclosed for adding the functionality of audio detection and extension of connectivity, the device 100 may, alternatively or additionally, provide many other functionalities.

Thus, the one or more components 140 for providing additional functionality may comprise a power priority unit, such as a Redundant Power System (RPS), for supplying backup power for at least a part of the device 100. The additional means of supplying power may be used to compensate for inadequate power received through the powered device (PD) port.

The one or more components 140 for providing additional functionality may comprise a Bluetooth unit configured to wirelessly communicate with one or more further devices using a Bluetooth communication standard.

The one or more components 140 for providing additional functionality may comprise a WiFi unit configured to wirelessly communicate with one or more further devices using one or more communication standards for wireless network standards on a wireless Local Area Network.

The one or more components 140 for providing additional functionality may comprise an RFID unit configured to allow near field communication wireless communication with the device.

The one or more components 140 for providing additional functionality may comprise a Storage unit adapted to provide storage of digital data. For example, the device 100 may comprise a buffer memory adapted to temporarily store data before transmitting it to the apparatus 110.

The one or more components 140 for providing additional functionality may comprise one or more sensors adapted to measure one or more parameters. Such parameters could for example relate to physical, chemical or biological quantities such as for example, humidity, temperature, pH level, particle number density, light absorption or the like. The one or more sensors may be biometric sensors.

The device further comprises logic circuitry 150 for controlling the additional functionality. The logic circuitry 150 is a microcontroller unit, MCU.

The first 130 and second 132 connectors of the device 100 are both Ethernet connectors. Specifically, both the first 160 and second 162 connector comprises a respective RJ45 port. Thus, it is physically possible to connect the device in more than one way. As disclosed herein, the logic circuitry 150 of the device 100 is not directly accessible in the network 120 when the device 100 is connected to the network 120 via the first connector 130, i.e. according to the operational connection scheme. However, the logic circuitry 150 of the device 100 can be accessed and controlled from the network 120 when the device 100 is connected to the network 120 according to a maintenance connection scheme, characterized by the network 120 being connected to the device 100 via the second connector 132. Connecting the device 100 to the network according to the maintenance connection scheme is useful when performing maintenance of the device 100, such as for example when upgrading the firmware of the device. As a physical adjustment is required to switch between the operational and maintenance connection schemes, there risk of unauthorized intrusion from the network 120 into the device 100 is small.

Figure 2:
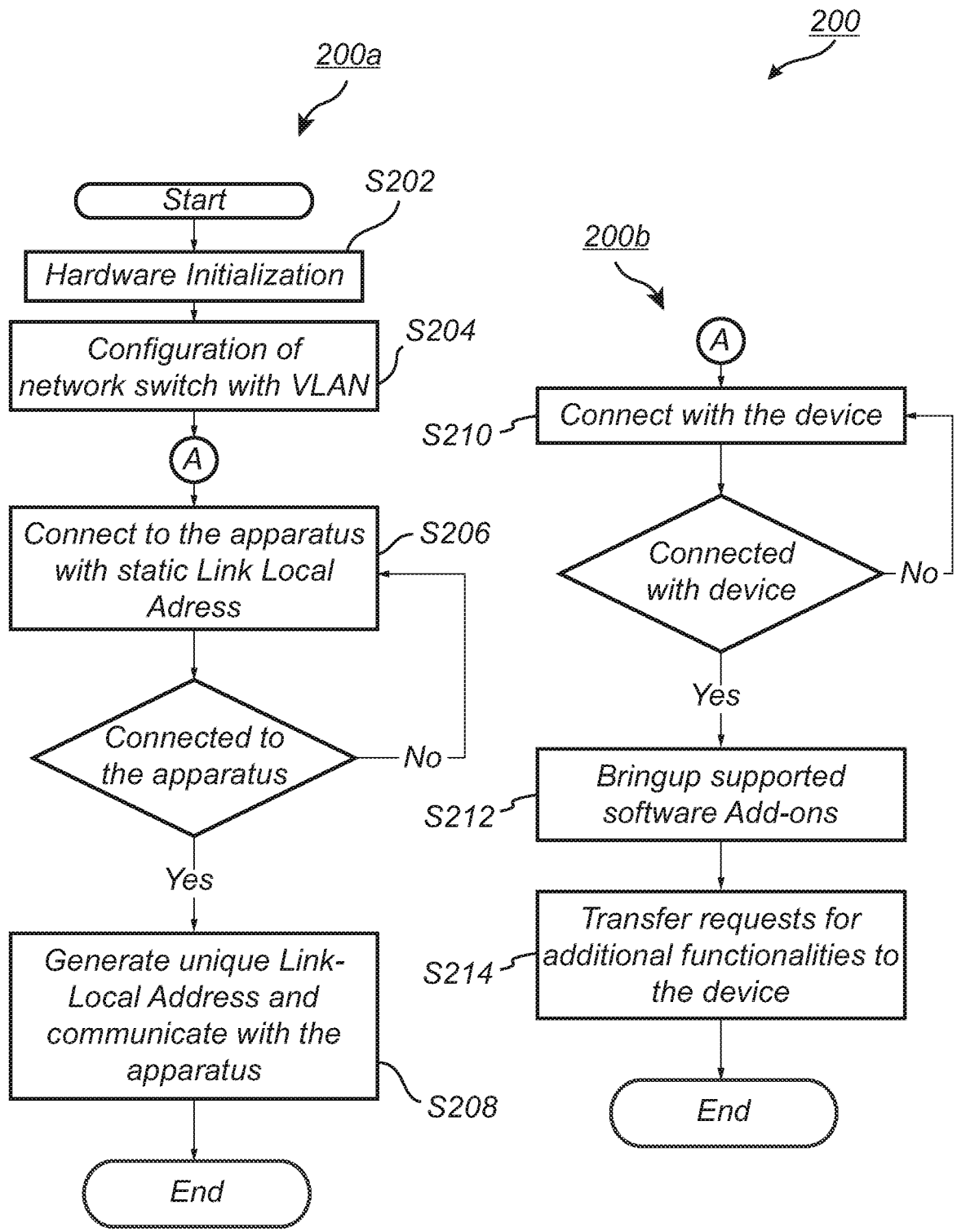
FIG. 2 shows a flow chart of a method for adding functionality to an apparatus according to embodiments.

FIG. 2 shows a method 200 of providing additional functionality to an apparatus 110 having a network connector 112 by which the apparatus 110 is configured to be connected to a network 120 and to be allocated an identifier 114 in the network 120. The method comprises a number of steps.

Upon having connected the network connector 112 of the apparatus 110 to a first connector 130 of a device and a second connector 132 of the device 100 to the network 120, a series of steps will be performed by the device 100 (flow chart 200a in FIG. 2). An initial step is initiating S202 a logic circuitry 150 of the device 100 for controlling the additional functionality. The device 110 will boot up, whereby the hardware of the device 100 will be possible to access. A further step is configuring S204 a network switch 170 of the device 100 to communicate using a second network portion 162. The network switch 170 is configured to operate on the second virtual local area network, VLAN2. Yet a further step is initiating a connection between the device 100 and the apparatus 110 using the second network portion 162. The step of initiating the connection comprises: connecting S206 the device 100 to the apparatus 110 using a static link-local address. Specifically, the device 100 waits for a connection from the apparatus 110 over the static link-local address. Upon having connected the device 100 to the apparatus 110, a unique link-local address is generated S208, by the device 100, for communicating with the apparatus 110.

Another series of steps will be performed by the apparatus 110 (flow chart 200b in FIG. 2). One step is connecting S210 the apparatus 110 with the device 100 using the unique link-local address. A further step is launching S212 software add-ons for providing control over a functionality of the device 100. The software add-ons may be executed on the apparatus 110, the device 100 or on another device capable of executing the software add-ons. Yet a further step is transferring S214 requests to the device 100 for accessing the additional functionality, whereby the additional functionality is accessible in the network 120 via the apparatus 110 using the second network portion 162. In other words, once the requests are accepted, control over said functionalities will be given to the software add-ons. The software add-ons are configured to communicate with, and be controlled by, a main software having a software interface which appears as if the functionality of the device 100 is part of the functionality of the apparatus 110. Thus, a user controlling the apparatus 110 and the device 100 will not see which one from the device 100 and the apparatus 110 that performs a specific function.

If a request for recording audio is transmitted from the apparatus 110 to the device 100, and the request is accepted by the device 100, the device will initiate capturing of digital audio data using the audio capturing unit 140a. The device 100 is configured to transmit the captured digital audio data to the apparatus using the local communication protocol 162 as a real time streaming protocol (RTSP) stream. The transmission of streaming data from the device 100 to the apparatus 110 will continue until a command is received by the device 100 to stop the audio capturing process. The streamed digital audio data may be synchronized with video data captured by the apparatus 110 using the RTSP protocol.

The person skilled in the art realizes that the present teachings are by no means is limited to the embodiments described above. On the contrary, many modifications and variations are possible within the scope of the appended claims.

For example, the device may be configured to add functionality to the apparatus by providing further components or functionalities such as a ZigBee communication module, a Z-wave communication module, a digital signal processing (DSP) module, SPDIF, a USB module, an RS485 module, an SD Card reader module, etc.

Additionally, variations to the disclosed embodiments can be understood and effected by the skilled person in practicing the claimed teachings, from a study of the drawings, the disclosure, and the appended claims.

What is claimed is:

1. A device for providing additional functionality to an apparatus having a network connector by which the apparatus is configured to be connected to a network and to be allocated an identifier in the network, the device comprising:
   a first connector for connecting the device to the network;
   a second connector for connecting the device to the network connector of the apparatus, whereby the device is adapted to be connected between the network and the apparatus; and
   one or more components for providing the additional functionality and logic circuitry for controlling the additional functionality,
   wherein the device is configured to allow communication between the network and the apparatus through the device using a first network portion,
   wherein the device is configured to communicate with the apparatus using a second network portion,
   wherein the logic circuitry of the device, when connected between the network and the apparatus, is accessible in the network via the apparatus using:
      the first network portion connecting to the apparatus through the device while having no access to the logic circuitry of the device, and
      the second network portion connecting the apparatus to the device to access the logic circuitry.

2. The device according to claim 1, wherein the logic circuitry is accessible in the network via the apparatus using the identifier allocated to the apparatus.

3. The device according claim 1, wherein the second connector is the connector among the first and second connectors being adapted to receive an identifier from the network, the identifier allowing the connector to be identifiable from the network using the first network portion.

4. The device according to claim 1, wherein the second connector is associated with an identifier identifiable using the second network portion.

5. The device according to claim 1, wherein the device is configured to transmit communication from the network to the apparatus using the first network portion.

6. The device according to claim 1, wherein the device is configured to transmit communication from the apparatus to the network using the identifier allocated to the apparatus and using the first network portion.

7. The device according to claim 1, wherein at least one of the first and second connectors is an Ethernet connector, wherein preferably both the first and second connectors are Ethernet connectors.

8. The device according to claim 1, wherein a network communication protocol used in the first network portion comprises one or more data communication protocols selected from the group consisting of: TCP/IP, UDP, SSH, HTTP, HTTPS, FTP, SMTP, SMB, RTSP, RTP, SFTP, NTP, ARP, PING, VPN, SRTP, SRTCP.

9. The device according to claim 1, wherein a local communication protocol used in the second network portion comprises one or more data communication protocols implemented using link-local addressing, the one or more data communication protocols being selected from the group consisting of: TCP/IP, PPP, Ethernet, ULAN.

10. The device according to claim 1, wherein the device further comprises a network switch connected between the second connector and the logic circuitry.

11. A system comprising:
   a monitoring camera; and
   a device for providing additional functionality to the monitoring camera having a network connector by which the monitoring camera is configured to be connected to a network and to be allocated an identifier in the network comprising:
   a first connector for connecting the device to the network;
   a second connector for connecting the device to the network connector of the monitoring camera, whereby the device is adapted to be connected between the network and the monitoring camera; and
   one or more components for providing the additional functionality and logic circuitry for controlling the additional functionality,
   wherein the device is configured to allow communication between the network and the monitoring camera through the device using a first network portion,
   wherein the device is configured to communicate with the monitoring camera using a second network portion,
   wherein the logic circuitry of the device, when connected between the network and the monitoring camera, is accessible in the network via the monitoring camera using:
      the first network portion connecting to the monitoring camera through the device while having no access to the logic circuitry of the device, and
      the second network portion connecting the monitoring camera to the device to access the logic circuitry.

12. The system according to claim 11 further comprising one or more components for providing the additional functionality.

13. The system according to claim 12, wherein the additional functionality is selected from any one or a combination of the following: audio capturing means for capturing audio signals; analogue I/O connectivity for transmitting and/or receiving analogue signals; digital I/O connectivity for transmitting and/receiving analogue signals; serial connectivity for communicating using serial data protocols; storage connectivity for connecting to external storage means; storage means; power connectivity for receiving and/or supplying power; illumination devices or heaters; access control connectivity for connecting to external access control means; and access control means.

14. A method for providing additional functionality to an apparatus, the apparatus having a network connector by which network connector the apparatus is configured to be connected to a network and to be allocated an identifier in the network, the method comprising:
   connecting a device between the network and the apparatus by connecting a first connector of the device to the network connector of the apparatus and connecting a second connector of the device to the network;
   initiating a logic circuitry of the device for controlling the additional functionality;
   configuring a network switch of the device to communicate with the apparatus using a second network portion;
   initiating a communication between the device and the apparatus using the second network portion;
   launching software for providing control over a functionality of the device;
   transferring requests to the device for accessing the additional functionality, wherein the device is configured to allow communication between the network and the apparatus through the device using a first network portion; and accessing the additional functionality in the network via the apparatus, wherein the accessing is performed using:
- the first network portion connecting to the apparatus through the device while having no access to the logic circuitry of the device, and
- the second network portion connecting the apparatus to the device to access the logic circuitry.

15. The method according to claim 14, further comprising accessing the logic circuitry in the network via the apparatus using the identifier allocated to the apparatus.

* * * * *